March 17, 1936.  R. STEENECK  2,034,064
STOCK SELECTING AND INDICATING SYSTEM
Filed Nov. 12, 1929  4 Sheets-Sheet 1

Inventor
Robert Steeneck
By his Attorney
Eugene C. Brown

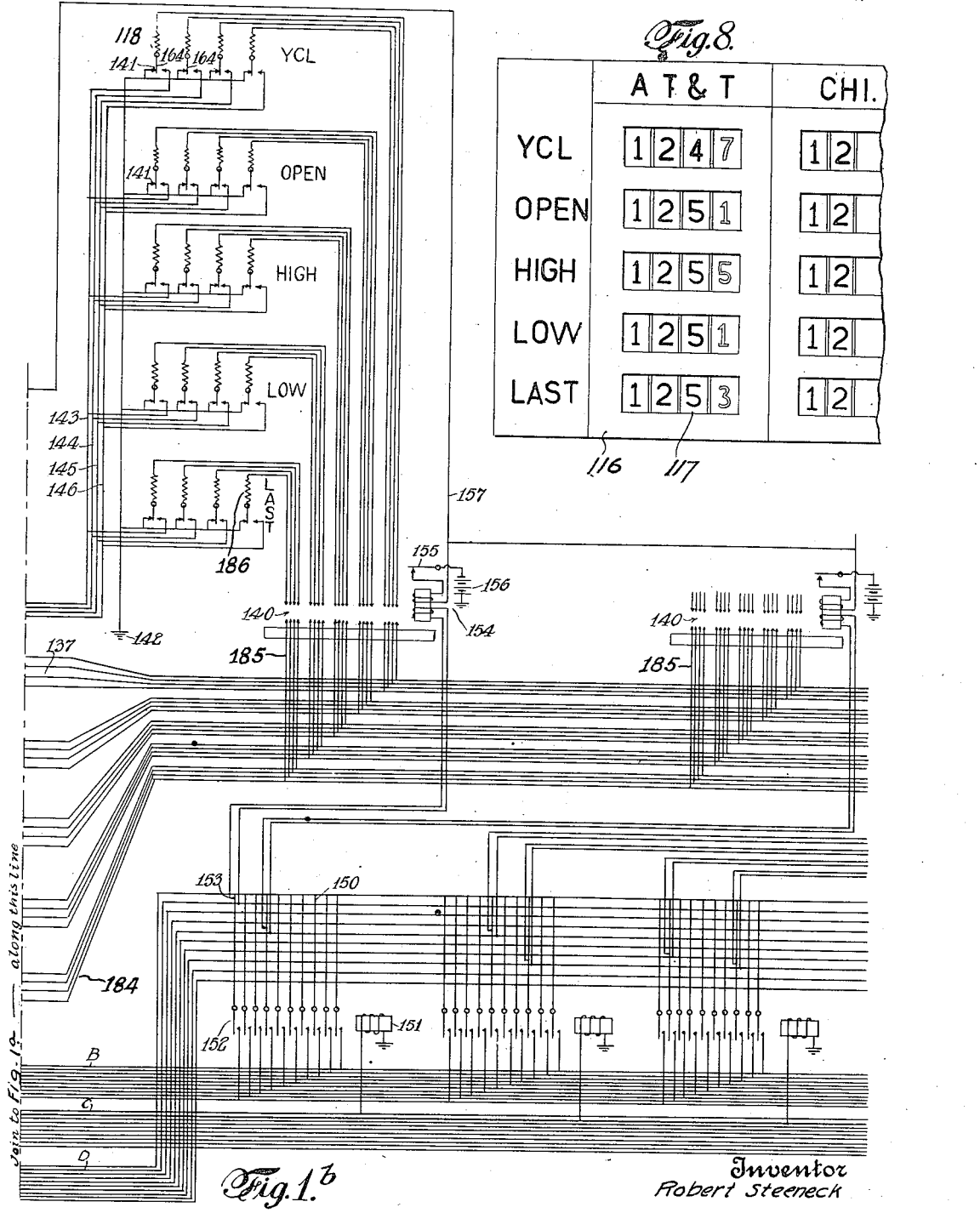

March 17, 1936.   R. STEENECK   2,034,064
STOCK SELECTING AND INDICATING SYSTEM
Filed Nov. 12, 1929   4 Sheets-Sheet 3
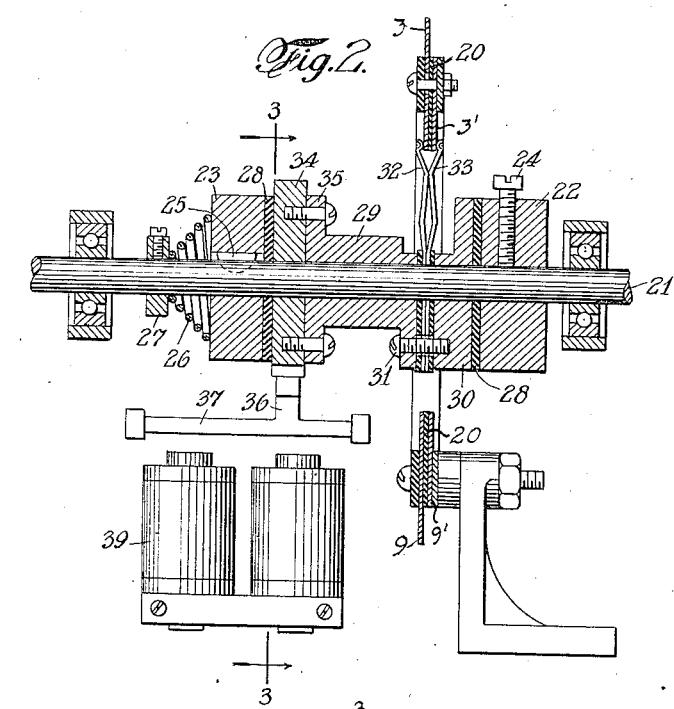
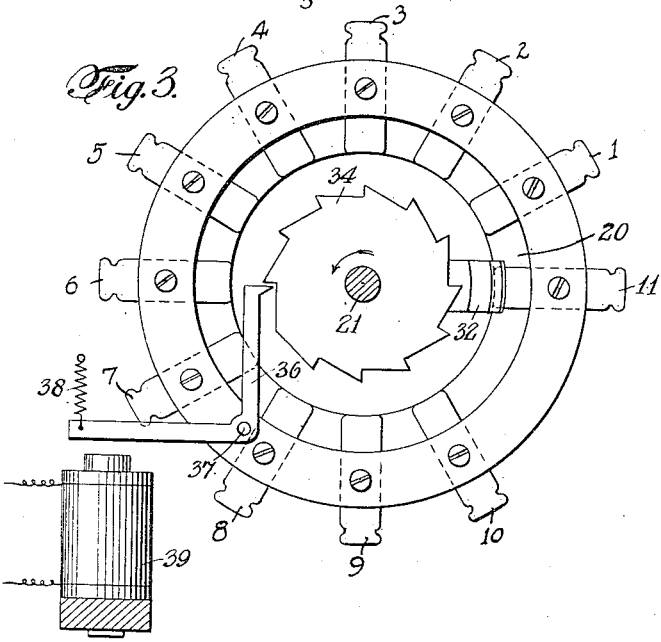
INVENTOR
Robert Steeneck
BY Eugene C Brown
ATTORNEY

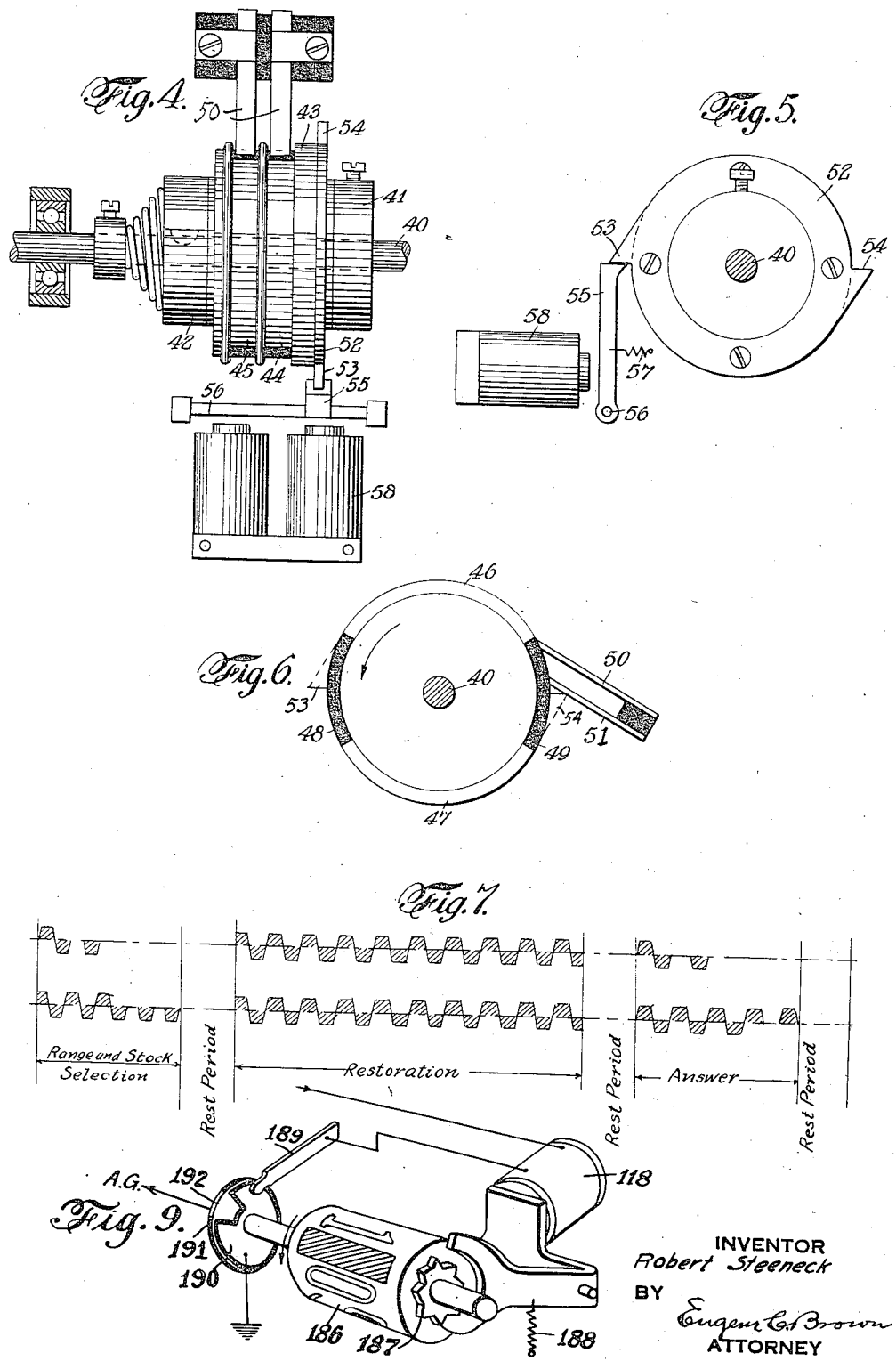

Patented Mar. 17, 1936

2,034,064

UNITED STATES PATENT OFFICE 2,034,064

STOCK SELECTING AND INDICATING SYSTEM

Robert Steeneck, New York, N. Y., assignor to The Western Union Telegraph Company, New York, N. Y., a corporation of New York Application November 12, 1929, Serial No. 406,654

9 Claims. (Cl. 177—353)

This invention relates to electric signaling and indicating means and more particularly to a method of and apparatus for translating predetermined electric signals into selecting and indicating impulses, whereby information concerning a large number of different items may be visibly indicated at a plurality of distant stations all controlled over a relatively small number of line wires from a common transmitting station.

The invention is especially applicable to the indicating or posting of varying quotations or prices of a multitude of items such as stocks, bonds and commodities and the present description, for the purpose of explaining the invention, will be confined to an automatic stock quotation board and to the selecting and indicating mechanism therefor, although it is to be understood that the invention is not limited thereto.

The transmission of code signals corresponding to the desired quotation may be controlled from a common point, such as a stock exchange and distributed to receiving and translating apparatus disposed in brokers' offices, banks, and similar places so that the quotations will be posted automatically and with a minimum delay. The present invention is concerned only with the apparatus and methods employed at the receiving stations.

The information concerning each stock quotation which it is generally desired to post in a broker's office comprises the "open", "high", "low" and "last" quotation of each stock in which the particular broker and his customers are interested, together with certain information concerning the past history of the stock, such as, "yesterday's close". The numerical value of the quotation may involve four digits, such as hundreds, tens, units and fractions. It is necessary, therefore, to provide on the quotation board or blackboard for each item or stock, five sets of indicators, namely, the "yesterday's close", "open", "high", "low", and "last" sets, each set having four indicator units for posting the hundreds, tens, units and fractional values of the stock.

The receiving apparatus in response to the transmitted signals must, therefore, select the stock to be posted, select the range, i. e., whether the "open", "high", "low", "last" or "yesterday's close" quotation and repeat the indicator operating impulses selectively to each of the indicator units of the group or range selected.

It is obviously impractical to control the indicators at a plurality of brokers' offices from a central transmitting station through the use of a separate line connection for each stock. Accordingly, it is desirable to provide means for transmitting current impulses, representative of the quotations of the numerous stocks, over a relatively small number of line wires and to provide selecting means at each indicating board to choose the particular stock and range, the quotation of which it is desired to post. The reduction of the number of line wires to a relatively small number requires that the selecting and indicating means be operated at a high speed, in order to take care of the rate at which the sales are made at the stock exchange.

Taking into account the reasonable future requirements, the selecting and indicating apparatus should be capable of selecting any one of a thousand or more different stocks or items and to operate at least four indicator units for each quotation and in the event that the "high" or "low" quotations are transmitted simultaneously with the "open" or "last" quotations, at least eight indicator units must be actuated. With the present rate of transactions conducted at the stock exchange the system must be capable of responding to, from thirty to sixty new quotations per minute.

It has been proposed, heretofore as shown in U. S. Patents Nos. 1,890,876—Hazelton, and and 1,890,878—Hazelton et al, both granted December 13, 1932, to select and operate the desired indicator units through a total of four transmitting channels extending between the transmitting and receiving stations such channels comprising either four separate line wires or two line wires having battery of positive and negative polarity applied to each line in conjunction with polarized relays at the receiving station for responding to the direction of current transmitted over each of the lines. Obviously a single line wire could be employed with a rotary transmitter at the sending station and a synchronously rotating distributor at the receiving station for distributing the signal impulses to the four control channels of the receiving apparatus.

The four control channels are employed for selecting concurrently, the range and stock. For this purpose each group of indicators comprising the range, i. e., "yesterday's close", "open", "high", "low" and "last" and combinations thereof are designated by single digit numbers, the "last" quotation, for instance, being designated (1); "low and last", (2); "high and last", (3); "low" (4); "high" (5); "open" (6); "high and open" (7) and "yesterday's close" (8).

Similarly each stock is arbitrarily designated by a three digit number, the stocks having the greatest volume of sales and hence those most often quoted, being designated by digits of low order as 111, 121, 211 and so forth.

The range is selected by transmitting over channel one for instance a number of impulses corresponding to the digit number of the range to be posted and the stock is selected by sending over channels two, three and four, impulses corresponding in number to the hundreds, tens and unit digits, respectively, of the stock designating number. The receiving apparatus in response to such impulses selects the stock and range and subsequently operates to transfer the four control channels from the selecting mechanism to the four indicating units of the range and stock selected. Each indicator unit may then be operated by transmitting the required number of impulses over the channels connected thereto.

In order to eliminate accumulative errors, means is preferably provided for restoring each indicator to "blank" position before transmitting the quotation or "answer". The restoration has been accomplished, in the systems heretofore proposed, by either transmitting a series of ten impulses over each channel, to step the indicators around to "blank" position or by transmitting a release signal to release the indicator and permit it to return to its normal position under the action of a spring.

After the completion of the transmission of a quotation, the receiving mechanism is restored to its normal position in readiness to respond to the succeeding quotation.

In automatic telephony where similar selecting problems are involved, it is the practice to employ rotary selecting switches having movable contacts which are rotated over a circular row of stationary contacts by a magnet in response to the selecting impulses. In attempting to apply these rotary selecting switches to the operation of the selecting mechanisms of a stock quotation board, difficulty has been experienced because of the much greater speed with which the signals must be transmitted. The length of the transmitted impulses to which these rotary selecting switches must respond is relatively short due to the large number of impulses required for the selection and posting of a particular quotation. For instance, in order to transmit the shortest group of "selecting" and "answer" impulses, together with the necessary "restoration" impulses and rest periods, requires a minimum of about twenty-seven cycles and with the longest signals a maximum of about forty-five cycles. If the quotations are to be transmitted at the rate of from thirty to sixty per minute and allowing for the necessary delay between the transmission of each quotation, it is necessary that the signal impulses be transmitted at the rate of from twenty to forty cycles per second.

Each cycle is composed of two actuating impulses, i. e., a negative actuating impulse and a positive actuating impulse so that each impulse has a period of only about one-fortieth to one eightieth of a second in which to operate the rotary switch. Due to transmission losses the effective length of the impulses is considerably shortened. At this speed of operation, the rotary switches are somewhat erratic in operation and are not dependable.

Difficulty is also experienced in operating the individual indicator units at the stock quotation board due to the shortness of the impulses, and for this reason it has been proposed to employ pulse stretching relays involving quick-to-operate and slow-to-release relays to lengthen the impulses sufficiently to properly operate the indicating units. Such pulse stretching relays require frequent adjustment and attention and are not entirely dependable.

One of the objects of my invention is, therefore, to provide in a stock quotation receiving system, a means of regenerating or lengthening the receiving indicator operating impulses without the use of so-called pulse stretching relays, which means will produce impulses of uniform length irrespective of the attenuation or shortening of the transmitted impulses.

Another object is to provide an improved selecting switch which is positively driven and which will operate accurately and dependably in response to high speed impulses.

A further object is to provide an improved "counting chain" for controlling the operation and restoration to normal of the various elements of the system in their proper sequence.

A further and more general object is to provide an improved selecting and indicating system for automatically posting stock quotations and similar data which will operate rapidly, dependably and accurately in response to transmitted signals and which is relatively simple in construction and operation and free to a large extent from electromagnetic relays.

Other objects and advantages will hereinafter appear.

In accordance with my invention I provide a receiving system which operates on a sequence of signals comprising a "selecting" group of positive and negative impulses, a rest period, a "restoration" group of positive and negative impulses, a second rest period, an "answer" group of positive and negative impulses and a third rest period.

The selecting mechanism which responds to the "selecting" group of impulses comprises a group of four rotary selecting switches, one for each control channel. The selecting switches each have their rotary member operated by a slip clutch device from a continuously rotating shaft and are normally retained against rotation by a pawl and ratchet. The pawl is released by a magnet in response to each selecting impulse to permit the rotary member to be advanced over one contact. In this manner the range and stock selection may be set up through the rotary switches by a step-by-step movement thereof.

A counting chain of relays is also provided, controlled by a slow-to-release relay during each rest period, to effect the operation of the various elements of the system in their proper order. At the completion of the transmission of the selecting group of impulses, and during the first rest period one of the relays of the counting chain operates, (1) to apply battery to the contacts of the selecting switches to complete the selecting operation, and (2) to transfer the four communicating and transmitting channels from the selecting switches to the pulse regenerating device.

The pulse regenerating device comprises a group of rotary commutators, preferably two for each communicating channel. The commutators are motor driven through a friction or slip clutch and are normally held stationary by a stop mechanism which is released by each signal of the "restoration" and "answer" groups, to permit the commutators to rotate a definite distance and thus transmit to the indicator units, operating impulses of definite length.

During the restoration period the ten restoring impulses over each channel are regenerated and applied to the selecting indicator magnets to restore the indicator drums to their normal or blank position. The indicator drums are rotated by a step-by-step-movement and the ten impulses are sufficient to move the drums to their blank position in the most unfavorable setting thereof. As each drum reaches its blank position the ground connection is automatically removed from its magnet winding so that the magnet does not respond to the remaining restoration impulses.

During the transmission of the signals of the restoration group the next relay of the counting chain operates (1) to remove the battery connection from the selecting switch and (2) to apply battery to the release magnets of the selecting switches. This latter battery connection causes the selecting switches to rotate around to their starting position in readiness to respond to the next group of "selecting" impulses to be transmitted.

At the conclusion of the "restoration" group of impulses and during the second rest period the succeeding relay of the counting chain operates (1) to apply ground to the windings of the indicator magnets so that they may respond to the subsequently transmitted "answer" impulses and (2) to remove the battery connection from the windings of the release magnets of the selecting switches.

The "answer" group of impulses are regenerated and supplied to the selecting indicator magnets to step the indicator dials around to the proper position corresponding to the quotation being transmitted. During this period the next relay of the counting chain operates to prepare a circuit for the final relay of the chain and at the conclusion of the "answer" and during the final rest period, the last relay of the counting chain operates to restore the preceding relays of the counting chain to normal in readiness for the next quotation and at the same time to restore the range selecting and stock selecting relays to their normal position.

The system is then in readiness for the succeeding quotation.

It sometimes occurs after prolonged operation of the system that the counting chain may get out of step with the signals and provision is made, therefore, to re-set the relays of the counting chain to their normal position by transmitting a predetermined code signal at frequent intervals. This code in the present system comprises two sets of ten impulses each, over the range selecting channel. At least one of such sets of impulses will be effective either to operate the range selecting switch to their tenth contact, to complete a circuit for returning each of the counting relays to its normal position, or to return the counting relays to normal by completing the normal operating cycle thereof In order that the invention may be more fully understood reference will be had to the accompanying drawings in which:

Figures 1a and 1b illustrate a circuit diagram showing in part the arrangement of the apparatus comprising one embodiment of the invention;

Figure 2 is a vertical sectional view of a selecting switch;

Figure 3 is a section on the line 3—3 of Figure 2;

Figure 4 is an elevation of the pulse regenerating unit;

Figure 5 is an elevation of the stop-start apparatus of the pulse regenerating device;

Figure 6 is a section showing the contact arrangement of the pulse regenerating device;

Figure 7 is a current-time diagram showing the arrangement of the current variations transmitted over the four communicating channels for controlling the receiving system of Figure 1; and Figure 8 is a fragmentary view of a quotation board showing the arrangement of the indicator units.

Figure 9 is a perspective view of the operating parts of one of the indicator units.

Figure 1A:
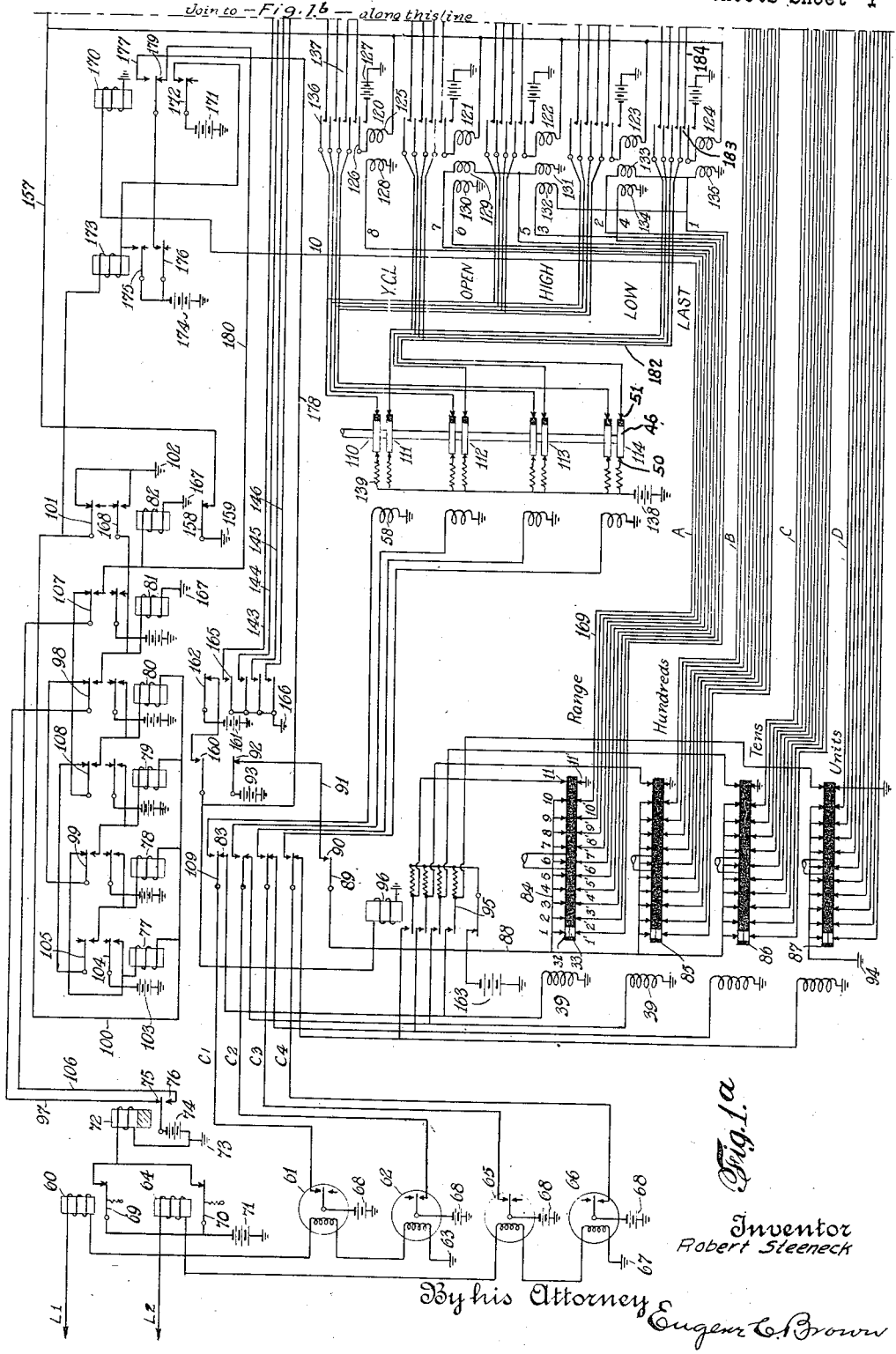

Referring first to Figures 2 and 3 for a detailed description of the rotary selector switch, it will be seen that the switch comprises an annular insulating member 20 having contacts 1 to 11 on one side thereof and corresponding contacts 1' to 11' disposed on the opposite side thereof. A shaft 21 extends centrally of the member 20 and is driven at a constant speed by a motor, not shown. Two spaced clutch members 22 and 23 are secured to the shaft so as to rotate therewith. Clutch member 22 is made rigid with the shaft, as by a set screw 24 and clutch member 23 is movable longitudinally of the shaft while rotating therewith, through a key 25. A spring 26 bearing against a fixed member 27 tends to move the clutch member 23 towards the clutch member 22. The opposed faces of clutch members 22 and 23 are supplied with a friction material 28. Intermediate members 22 and 23, is a hub composed of two parts 29 and 30 secured together by screws 31. A brush, having two radial wiping arms 32 and 33, is clamped between the hub members 29 and 30. The wiping arms 32 and 33 project into the path of the contacts 1 to 11 and 1' to 11' and bridge the same as the hub rotates. A ratchet wheel 34 is secured to the flanged end 35 of the hub member 29.

The assembly comprising the ratchet wheel and the hub members 29 and 30 is loose upon the shaft 21 and is normally held against rotation by a pawl 36 pivoted at 37. The pawl is normally retained in engagement with the teeth of the ratchet wheel by a spring 38 and may be moved out of engagement therewith, by a magnet 39. The magnet 39 is operated by the selecting impulses transmitted over the line, each impulse momentarily releasing the pawl and allowing brushes 32 and 33 to move forward the space of one contact.

The contacts 1 to 10 are spaced about thirty degrees apart and the spacing of contact 11 is lengthened to occupy an extended portion of the member 20. One tooth of the ratchet wheel 34 is omitted to permit the brush to travel from the tenth contact to the end of the eleventh contact by one releasing impulse. The eleventh contact provides a short circuit connection for the magnet 39, as will appear more fully hereinafter, and is made long to give sufficient time for the return of the pawl to its stop position after the short circuiting of the magnet 39 occurs.

The rotary pulse regenerating device will now be described with reference to Figures 4, 5, and 6. It comprises a continuously rotating shaft 40 having two clutch members 41 and 42 mounted thereon so as to rotate therewith in the same manner as in the selecting switch. Disposed between the clutch members 41 and 42 is a drum 43 loosely mounted upon the shaft 40 and adopted to be rotated by engagement of the clutch members therewith. The drum has two contact rings 44 and 45 insulated from each other and each comprising two sets of conducting contacts 46 and 47 separated by two insulated sections 48 and 49. A pair of brushes 50 and 51 engage each of the contact rings and are bridged by the contacting segments for a definite period during each half revolution of the drum.

The drum is provided with a stop ring 52 having two radial projections 53 and 54, one of which is normally engaged by a latch 55 to retain the drum against rotation. The latch 55 is pivoted at 56 and normally held in engagement with the projections 53 or 54 by a spring 57. A magnet 58 is provided for releasing the latch to permit the drum to make a half revolution. The bridging of the brushes 50 and 51 during each half revolution of the drum completes a circuit, to be subsequently described, for the magnets of certain of the indicator units at the quotation board.

In Figure 7 I have shown the type of signal to which the receiving apparatus must respond to select the range and stock and to operate the indicator units. These signals, comprising positive and negative impulses, may be transmitted over two lines $L_1$ and $L_2$, line $L_1$ forming communicating channels one and two and line $L_2$ forming communicating channels three and four. The positive impulses transmitted over lines $L_1$ and $L_2$ constitute the control channels one and three and negative impulses transmitted over lines $L_1$ and $L_2$ constitute control channels two and four respectively.

The signals transmitted over any one channel comprise impulses of definite period and polarity separated by a no impulse period of equal or greater length. The transmitting mechanism is arranged so that the signals transmitted over channel one, for instance, occurred during the no impulse period of channel two and vice versa. Channels three and four are similarly related so that the signals constituting one channel of communication are interposed between those constituting the other channel. For convenience a positive impulse and an adjacent negative impulse over one line is termed a "cycle".

The group of impulses employed for making the stock and range selection are for convenience termed the selecting train. If, in accordance with the example illustrated in Figure 7, it is desired to post the last quotation of a stock arbitrarily designated by the No. 236, a single positive impulse would be transmitted over line $L_1$, since as previously explained the "last" quotation was arbitrarily designated by the digit one. Immediately following the positive impulse two spaced negative impulses, corresponding to the hundreds digit of the numerical stock designation would be transmitted over line $L_1$, three positive impulses corresponding to the tens digit would be transmitted over line $L_2$ and six negative impulses corresponding to the units digit would also be transmitted over line $L_2$ and interspaced as far as possible with the positive impulses. These trains of selecting impulses serve to actuate the selecting mechanism at the receiving station to place the "last" set of indicators of stock No. 236 in communication with the lines $L_1$ and $L_2$.

Following the selecting group a rest period is provided to permit the slow to release relay which controls the counting chain to release. This rest period is followed by a series of ten positive and ten negative impulses over both lines for restoring the indicators to "blank" position. A second rest period follows the restoration group and the answer group of impulses follows the second rest period. The positive impulses of the answer group transmitted over lines $L_1$ and $L_2$ control the hundreds and units indicators at the quotation board and the negative impulses transmitted over lines $L_1$ and $L_2$ control the tens and fractions indicators. Thus for a stock having a quotation of 125⅜ the impulses would be arranged as shown in Figure 7.

In Figure 8, I have shown one form which the indicator board may take. It comprises a panel 116 for each stock having five sets of indicators, each set consisting of four indicator units. The five groups represent the "yesterday's close", "open", "high", "low" and "last" quotations and the four units for each set represent the hundreds, tens, units and fractional values of the stock. Each indicator unit may comprise a drum disposed behind the openings or windows 117 in the panel and having the numbers 1 to 9, 0 and a blank space thereon. The indicator drums are provided with operating magnets for stepping the drum around one space for each impulse transmitted thereto. In Figure 1b, the windings of the indicator magnets are diagrammatically illustrated at 118.

One form which the indicator units may take is shown in Figure 9. The indicator unit comprises a drum 186 having thereon numbers 1 to 9, 0 and blank. It is rotated by a magnet 118 through a pawl star wheel ratchet 187. Each impulse supplied to the magnet 118 steps the drum ahead one half space and upon release of the magnet a spring 188 moves the drum the remaining half space. The circuit to the magnet 118 is completed through a brush contact 189 which rubs against a conducting disk 190 mounted upon the shaft of the drum 186. The disk 190 is grounded as shown and is discontinuous at a zone 191 at which place a second contact strip 192 is located and insulated from the disk 190. The contact 192 is so disposed relative to the blank portion of the drum that the brush contact 189 rests thereon when the blank portion of the drum is visible in the indicator panel.

Thus it will be apparent that during the restoration period, as soon as the drum rotates to blank position, the ground connections for the magnet 118 will be broken by the brush passing off of contact 190 and on to the ungrounded contact 192. The magnet therefore will not be energized by subsequent restoration impulses. At the end of the restoration period the contact 192 is connected to ground in a manner to be subsequently described. The indicator magnet 118 is then in a condition to respond to the subsequent impulses constituting the "answer", to step the indicator drum around to the desired position. The ground connection to the contact 192 is for convenience termed the "actuating" ground.

It will be understood, of course, that various other types of indicators may be employed and the term "indicator" is used in the appended claims to include any device for displaying information.

Reference is now had to Figures 1a and 1b for a detailed description of the invention applied to a stock quotation board.

Line $L_1$ over which interspaced positive and negative signals are transmitted, is connected to one end of the winding of a neutral relay 60, the opposite end of this winding being connected to the windings of two polarized relays 61 and 62 in series and to the ground at 63. Similarly line $L_2$ is connected through the winding of a neutral relay 64 and the windings of two polarized relays 65 and 66 to the ground at 67.

The switch tongues of relays 61, 62, 65 and 66 are connected to batteries 68 and the contacts of these relays are connected to the four wires $C_1$, $C_2$, $C_3$ and $C_4$ in such manner that positive signals transmitted over line $L_1$, connect the wire $C_1$ to battery 68 and negative signals over line $L_1$ connect the wire $C_2$ to battery 68. Similarly positive and negative impulses over line $L_2$ serve to connect the battery 68 to wires $C_3$ and $C_4$ respectively through the relays 65 and 66.

Lines $C_1$, $C_2$, $C_3$ and $C_4$ constitute the four control channels for the selecting and indicator operating mechanism.

The contact tongues 69 and 70 of neutral relays 60 and 64 are connected together and to one terminal of a battery 71. The front contacts of these relays are also connected together and to one end of the winding of a slow-to-release relay 72 the opposite end of which is grounded at 73. A grounded battery 74 has one terminal connected to the tongue of relay 72. Relay 72 through its front and back contacts 75 and 76 respectively, controls the operation of the counting chain of relays which includes relays 77, 78, 79, 80, 81 and 82.

The channels $C_1$, $C_2$, $C_3$, and $C_4$ are connected through the back contacts 83 of relay 78 of the counting chain to the windings 39 of the release magnets which control the four rotary selecting switches 84, 85, 86 and 87. These switches are diagrammatically illustrated in Figure 1a as being provided with rotating brushes 32, 33 and stationary contacts 1 to 11 and 1' to 11', adapted to be bridged by the rotating brush 32, 33. The contacts 1 to 10 of selecting switches 84, 85 and 86 are connected by a wire 88 to the tongue 89 of relay 78 and through the front contact 90 thereof, conductor 91 and back contact 92 of relay 79, to a battery 93. Contacts 1 to 10 of selecting switch 87 are grounded at 94. The contacts 1' to 10' of each of the selecting switches are connected to the ten wires forming groups A, B, C and D respectively. Contact 9' of selecting switch 84 is unconnected. Contact 11 of each switch is connected through the tongues 95 of a restoring magnet 96 and the front contacts of said magnet are connected to the windings 39 of the releasing magnets for the selecting switches. Contact 11' of each of the selecting switches is grounded.

The operation of the selecting mechanism is as follows.

Assuming as in the example illustrated in Figure 7, it is desired to transmit the "last" quotation of stock No. 236 the signals transmitted over line $L_1$ would comprise one positive and two negative impulses and those transmitted over line $L_2$ would comprise three positive and six negative impulses. The transmission of the first impulse over lines $L_1$ and $L_2$ causes the slow-to-release relay 72 to pick up and through its front contact 75 to connect the battery 74 to a conductor 97. All of the relays of the counting chain at this time are in an unenergized condition and a circuit is therefore completed from the conductor 97 through the relay tongue 98 and back contact of relay 80, relay tongue 99 and back contact of relay 78 to the winding of relay 77 and thence through the conductor 100, relay tongue 101 and back contact of relay 82 to the ground 102. Relay 77 then picks up and completes a locking circuit for its winding through battery 103 and contact tongue 104. The tongue 105 of relay 77 moves to its front contact and prepares a circuit for the next relay 78 of the counting chain. The circuit of relay 78 is held open however, at the back or spacing contact of the slow-to-release relay 72.

The positive impulse of the selecting group transmitted over line $L_1$ operates polarized relay 61 and through the contacts thereof supplies an impulse to the winding 39 of the release magnet of the selecting switch 84 to permit the brush 32, 33 to step ahead to bridge contacts 1, 1'. This circuit is completed over wire $C_1$ and the back contacts 83 of the relay 78.

Similarly the two negative impulses transmitted over line $L_1$ are repeated through the contacts of relay 62 to operate the release magnet of selecting switch 85 to step the rotating brush 32, 33 over two of the contacts of the selecting switch. Rotary switches 86 and 87 are likewise stepped ahead to the third and sixth contact respectively by the three positive impulses and the six negative impulses transmitted over line $L_2$.

It should be noted here that selecting switch 84 controls the range selection and selecting switches 85, 86, and 87 control the hundreds, tens and units selections of the stock designating number.

The timing of the slow-to-release feature of the relay 72 is such that the relay does not release during the interval between successive impulses of one polarity transmitted over lines $L_1$ and $L_2$ and therefore the relay 72 remains picked up as long as any signals of the selecting train are being transmitted. The rest period following the selecting impulses is sufficiently long however, to permit the relay 72 to release. Upon release of this relay the battery 74 is connected through back contact 76, conductor 106, switch tongue 107 and back contact of relay 81, switch tongue 108 and back contact of relay 79 and switch tongue 105 and front contact of relay 77, to the winding of relay 78 and thence to the ground at 102. Relay 78 then picks up, completes its locking circuit and through contact tongue 99 prepares the circuit for the following relay 79. At the same time the four contact tongues 109 are moved from their back contacts 83 to their front contacts to transfer the channels $C_1$, $C_2$, $C_3$ and $C_4$ from the windings 39 of the release magnets of the selecting switches to the windings 58 of the release magnets of the pulse regenerating device shown diagrammatically at 110. The pulse regenerating device shown has four units 111, 112, 113 and 114 each comprising two rings or commutators.

The operation of relay 78 also closes contact 90 and completes the circuit from the battery 93 to the contacts 1 to 10 of selecting switches 84, 85 and 86. This battery connection is continued through contact 1' of selecting switch 84, contact 2' of selecting switch 85 and contact 3' of selecting switch 86 to the corresponding wires of the groups A, B and C respectively.

The ground connection 94 is also continued through the brush of selecting switch 87 and contact 6' thereof to the sixth wire of group D. These battery and ground connections effect the complete selecting operation.

Before proceeding further with the operation of the counting chain in response to the remaining signals of the restoration and answer groups, a description of the indicator selecting and indicator operating mechanism will be given.

The wires of group A connected to contacts 1' to 8' control a series of five "range" selecting relays 120, 121, 122, 123 and 124 for connecting the contacts of the pulse regenerating devices to the windings of the indicator magnets of the range selected. Relay 120 controls the "yesterday's close" set of indicators, relay 121 controls the "open" set of indicators and similarly relays 122, 123, and 124 control the "high", "low", and "last" sets of indicators respectively, at the quotation board.

Each of the relays 120 to 124 is provided with a locking winding 125 and one or more operating windings. The locking winding is connected at one end through one of the contact tongues 126 of the relay to a grounded battery 127. The opposite end of the winding 125 is grounded through conductor 157, tongue 158 of relay 82 to the ground 159. Relay 120 has a single operating winding 128 connected at one end to the ground and at the other end to the eighth wire of group A (counting from the bottom) and thence to contact 8' of the range rotary selecting switch 84. Relay 120 is thus operated when a range signal comprising eight impulses representing the "yesterday's close" is transmitted over line $L_1$.

Relay 121 has two operating windings, 129 and 130. Winding 129 is connected to the seventh wire and winding 130 to the sixth wire of group A, and through these wires to contacts 7' and 6' respectively of the rotary selecting switch 84. Relay 122 also has two operating windings, 131 and 132. Winding 131 is connected to the seventh wire of group A in series with winding 129 and independently to the fifth wire of group A, and winding 132 is connected to the third wire thereof. The operating windings 133 and 134 of relay 123 are connected respectively to the second and fourth wires of group A. The single operating winding 135 of relay 124 is connected to wire two in series with winding 132, to wire 3, in series with windings 132 and also to wire one.

It should be noted, that with the above described arrangement of the range relay windings certain combinations of the range relays may be obtained in response to definite range signals. Thus, for instance, contact 1 of the selecting switch operates the "last" relay 124, contact 2 operates both the "low and last" relays 123 and 124, contact 3 operates the "high and last" relays, contact 4 operates the "low" relay, contact 5 operates the "high" relay, contact 6 operates the "open" relay, contact 7 operates the "open and high" relays, and contact 8 operates the "yesterday's close" relay.

The operation of one or more of the range relays 120 to 124 through closure of the contacts 136 thereof, connects one wire from each of the pulse regenerating units 111, 112, 113, 114, to each of the four wires of one or more of the groups 137. The groups 137 terminate at the indicator magnets of the "yesterday's close", "open", "high", "low" and "last" indicators. The pulse regenerating drum 111 controls the hundreds digits of the quotation, drum 112 controls the tens digits, drum 113 controls the units digits and drum 114 controls the fractional values of the quotation.

During each half revolution of the rotary contact drums of the regenerating device, battery 138 is connected to the wires of group 137. In some instances as when the "low and last" indicators are operated simultaneously, two groups of indicators are connected to the contacts of the pulse regenerating devices. I have provided two separate contact rings for each drum connected to the contacts of the range relays in such manner that a separate contact ring is provided for each indicator to be operated. Thus, for instance the "high" or "low" indicators may be operated simultaneously with the "open" or "last" indicators. The "high" and "low" range relays, therefore, have their contacts connected to the opposite contact ring of each drum from the contacts of the "open and last" range relays. The "yesterday's close" indicators are operated separately and therefore may be connected to either ring of each of the drums. By connecting each set of indicators which operate at one time through separate rings of the contact drums and through separate resistances 139, the current delivered to each of the indicator units will be the same in each instance, regardless of whether one or two sets of indicators are operated.

Referring now to Figure 1b, it will be noted that each of the groups 137 is extended through multi-contact switches 140, to the windings 54 of each of the indicators provided for one stock. The circuit for the indicator windings are normally completed through the left hand contacts 141 of each of the indicator windings to the common ground 142. A separate ground connection is supplied through a group of conductors 143, 144, 145, 146 and the right hand contacts of the indicator windings. Conductor 143 provides a ground connection for the hundreds indicators and conductors 144, 145, 146 provide ground connections for the tens, units and fractions indicators respectively. These ground connections are termed the actuating grounds and their function is to enable the indicator drums to be reset from their normal or blank position during the answer period as will appear more fully hereinafter.

The stock selection is effected through a grid arrangement 150. The grid comprises a series of ten horizontal conductors and preferably ten groups of vertical conductors each group consisting of ten conductors. Three only of such groups of vertical conductors are shown in Figure 1b.

Each intersection of the vertical and horizontal conductors provides for the selection of an individual item or stock and the ten vertical groups of ten conductors each provide facilities for selecting a total of 999 different stocks having three digit designating numbers. The vertical conductors of each group are connected to the wires of group B, controlled through the selecting switch 85, in accordance with the hundreds digit of the stock designating member. The horizontal conductors of the grid are connected to the wires of group D controlled through the units selecting switch 87. The group of wires C which are controlled through the tens selecting switch, are connected to the windings of the grid relays 151 each of the wires being connected to one of the relays for closing a particular set of contacts 152, to connect one of the groups of vertical conductors to the group B.

The grid is provided at each intersection of a vertical and horizontal conductor with facilities for a plug connection whereby any indicator panel may be selected from such intersection. The plug connection has two terminals, one connected with the horizontal conductor and the other with the vertical conductor. Plug connections are indicated at 153. The terminal connected with the vertical conductor is joined to one end of the winding of a magnet 154, the opposite end of which is connected to the terminal joined to the horizontal conductor. The magnet 154 controls the operation of the stock switch 140. Magnet 154 is provided with a locking contact 155 which completes the locking circuit from a battery 156 through the locking winding of the magnet and through a conductor 157, back contact of counting relay 82, and switch tongue 158 thereof, to the ground at 159.

The stock selection is as follows: The signals corresponding to the hundreds digit of the arbitrary numerical stock designation, operate the selecting switch 85 to connect the battery 93 through one of the wires of group B to one of the contacts of the grid control switches 152. In the example illustrated in Figure 7 in which the hundreds digit was 2, the second contact of the rotary switch 85 completes the battery connection to the second contact of each of the switches 152. Similarly the tens digit of the stock designating number determines the particular group of contact 152 which are closed through relays 151 and the units digit determines the horizontal conductor of the grid which is connected to the ground 94 through the selecting switch 87. Thus in the case of stock number 236, vertical wire 2 of group 3 would be connected to the battery 93 and horizontal wire 6 to the ground 94. Therefore, the stock magnet 154 which is provided with a plug connection at the intersection of the second vertical and sixth horizontal conductor of group three, would be operated to close the contacts 140 and thereby connect each of the groups of wires 137 to the sets of indicators of one particular stock.

Referring back again to the operation of the counting chain it will be remembered that during the transmission of the selecting signals, relay 77 operated to prepare the circuit for relay 78 of the counting chain and during the first rest period following the selecting signals, relay 78 operated to transfer the control channels $C_1$, $C_2$, $C_3$ and $C_4$ to the windings 53 of the release magnets of the pulse regenerating device 110. At the same time relay 78 completed the battery connection for the contacts of the selecting switches to operate the "range", "stock" and "grid" control relays. Relay 78 also prepared the circuit for relay 79.

Immediately after the first rest period the restoration signals comprising ten groups of positive impulses and ten interspaced groups of negative impulses are transmitted over the line $L_1$ and $L_2$. These signals cause the slow to release relay 72 to pick up and connect the battery 74 through conductor 97, contact tongue 98 and back contact of the relay 80, and contact tongue 99 and front contact of relay 78, to the winding of relay 79 and thence to the ground at 102. Relay 79 then picks up, completes its locking circuit and through its switch tongue 108 prepares the circuit for the next relay 80. At the same time it opens the actuating battery circuit for the selecting apparatus at the contact 92 and thus removes the battery 93 from the contacts of the selecting switches. However, inasmuch as the range relays and the stock relays are each provided with the locking circuits through the ground connection 159, the removal of battery from the selecting switches does not disconnect the selected indicators from the contacts of the pulse regenerating devices 110. Relay 79 also closes its contact 160 and thereby applies battery 161 to the winding of restoring magnet 96, this circuit being completed through the switch tongue 162 and back contact of relay 80.

The operation of the restoring magnet 96 connects a battery 163 through the contacts of the relay to the windings 39 of the release magnets for each of the selecting switches. The magnets 39 upon being energized withdraw the pawls 36 from the ratchet wheels 34 and thereby permit the brushes 32, 33 to rotate until contacts 11, 11' are reached. The bridging of the contacts 11, 11' of each switch connects ground to the windings of the release magnets thus short circuiting their windings 39. The pawls 36 are then released to re-engage the ratchet wheel and stop the brushes in their normal position on contact 11 in readiness for the succeeding group of selecting signals.

The ten positive and ten negative impulses constituting the restoration group are repeated through the relays 61, 62, 65 and 66 to the release magnets 58 of the regenerating device to permit the contact drums thereof to make a half revolution for each impulse and thereby supply the ten indicator operating impulses to the magnets of the particular indicators selected by the selecting signals. The restoration circuit for the last fractions indicator may be traced from grounded battery 138 through one of the resistances 139 to brush 50, thence by contact ring 46 or 47 of drum 114 as it revolves to brush 51, the circuit being continued over conductor 182 and contact 183 of gang switch 133 to conductor 184, thence in multiple to wire 185 leading to each group of indicators and by contacts of one of the multi-contact switches 140 to the operating winding 186 of the fractions last indicator unit of the selected stock. The restoration circuit for the remaining indicators of each group may be similarly traced from the rotary commutators 110 to 114. The drums of the indicator magnets are thus stepped around until the blank portion thereof comes in front of the windows in the indicator panels at which time the ground connection through the left hand contacts 141 is broken at the indicator. This is represented in Figure 1b by movement of the switch tongues 164 to their right hand contacts. After the blank position has been reached the remaining restoration impulses are ineffective to rotate the drum due to the removal of the ground return from the indicator operating magnets.

At the end of the restoration period and during the following rest period the slow to release relay 72 releases and connects the battery 74 through the back or spacing contact of the relay, conductor 106, switch tongue 107, and back contact of relay 81, switch tongue 108 and front contact of relay 79, to the winding of relay 80, and thence to the ground at 102. Relay 80 then picks up, locks itself closed and through contact tongue 98 prepares a circuit for the next relay 81. It also opens the circuit from the battery 161 to the restoring magnet 96 through its contact tongue 162. The contacts of the magnet 96 are thus restored to their normal position, thereby removing the battery 163 from the windings 39 of the release magnets of the selecting switches. At the same time relay 80 closes a series of four contacts 165 to connect ground 166 through the four actuating ground lines 143 to 146 and through the right hand contacts of the indicator magnets to the windings thereof, thus conditioning the indicators to respond to the succeeding answer signals to step the indicators around to their new position.

The answer signal train which is also composed of interspaced positive and negative impulses transmitted over lines $L_1$ and $L_2$ is transmitted immediately following the second rest period. The first impulse operates the slow to release relay 72 and connects the battery 74 through the front or marking contact 75, conductor 97 and tongue 98 of relay 80 to the winding of the relay 81, and thence to the ground at 167. Relay 81 picks up and in so doing completes its own locking circuit and prepares the circuit for the following relay 82.

The signals of the answer group operate the release magnets 58 of the pulse regenerating device and thereby step the selecting indicators around to the desired position.

At the conclusion of the transmission of the answer signals and during the final rest period the slow to release relay 72 again releases and completes the battery circuit through conductor 106, contact tongue 107 and front contact of relay 81 to the winding of relay 82 and to the ground at 167. This relay then picks up and through its contact switch tongue 101 breaks the ground connection 102 for each of the relays 77, 78, 79, 80, thereby restoring these relays to their normal position. At the same time the ground connection at 159 is interrupted for the locking circuits of the range and stock relays so that these relays return to their normal position. Relay 82 also through its contact tongue 168 short circuits the locking battery of the relay 81 thereby restoring this relay to normal.

The restoration of relay 81 to normal breaks the circuit from the battery 74 to the relay 82 so that this latter relay is restored to normal.

The restoration of the counting chain to normal retransfers the channels $C_1$, $C_2$, $C_3$, $C_4$ from the pulse regenerating device to the selecting switches in readiness for the next group of selecting signals and disconnects the actuating ground 166 from the right hand contacts of the indicator magnets.

The system is thus placed in its normal position to respond to the next group of selecting and indicating signals.

It will be noted that the counting chain completes its cycle of operation due to the alternate picking up and releasing of the relay 72 as signal periods and rest periods succeed each other over the lines $L_1$ and $L_2$. It will be appreciated that if through faulty transmission an extra group of signals and a rest period should occur that the counting chain would be thrown out of step with the signals and in place of the final relay 82 operating during the final rest period it might operate during either the first or second rest periods. In such case the transfer of the channel $C_1$ to $C_4$ from the pulse regenerating device to the selecting switches would occur during the wrong part of the cycle.

To correct for such contingency I provide a means for restoring the counting chain into step with the signals at any desired intervals. This control is obtained through contact 10 of the range selecting switch. The contact 10 of the range selecting switch is connected through a conductor 169 to the winding of a correcting relay 170. When it is desired to correct for a possible out-of-step condition two series of ten selecting impulses followed by rest periods are transmitted over the range selecting channel to step the range selecting switch around to its tenth contact, thus applying battery to the winding of the correcting relay 170. Relay 170 then picks up and connects battery 171 through its contact 172 to the winding of a relay 173 and to the ground at 102. Relay 173 picks up in turn, locks itself up through battery 174 and contact tongue 175 and closes contact 176 thus connecting battery 174 through contact 176 and through the front contact 177 of relay 170, and conductor 178 to the winding of the release relay 96, thus energizing this relay and thereby restoring the selecting switch 84 to normal. This breaks the circuit to relay 170 and as its contacts fall back, a circuit is completed from the battery 174, contact 176 of relay 173, contact 179 of relay 170 and conductor 180 to relay 82, thus energizing this relay which, as stated before, effects the release of all of the preceding relays of the counting chain and thereby restoring the entire system to normal.

Two such groups of range signals are required since if the counting chain should be out-of-step, the first set would be transmitted while the channels $C_1$, $C_2$, $C_3$, $C_4$ were connected to the pulse regenerating device rather than to the magnets of the selecting switches hence would not operate the range selecting switch. This might also be true of the second group of signals. However, at the end of the transmission of the second group of correcting signals the system is necessarily restored to normal either through operation of the correcting relay 170 or through normal operation of the final relay 82 of the counting chain.

It will be noted that the operation of the counting chain is independent of difference in resistance of or of equality of balance between the circuits including the various relays and therefore faulty or premature operation of the relays cannot occur through dirty or corroded contacts, which would tend to equalize the resistances or unbalance the resistance of such relay circuits.

It will also be noted that the three relays 77, 79 and 81 of the counting chain are energized through the marking contact of the slow to release relay 72 and that relays 78, 80 and 82 are energized through the spacing contact of relay 72. The former group of relays are for convenience termed the marking relays of the counting chain and the latter group the spacing relays. It will be further noted that the circuit from the battery 74 and marking contact 75 of relay 72 is prepared for the windings of the marking relays through the contacts of the spacing relays and vice versa. Each relay of one group prepares the circuit for the succeeding relay of the other group directly through one of its front contacts, which circuit is not completed until the relays 72 returns its contact tongue to its opposite contact. There is no possibility, therefore, of any of the relays operating except in the proper sequence and as the relay 72 moves from one of its contacts to the other.

It will be obvious that many changes may be made in the construction and arrangement of the various elements of the system and in the circuit arrangement without departing from the invention, and I do not desire to be limited to the exact details shown and described except in accordance with the appended claims.

What is claimed is:

1. In an electrical indicating system of the class having a multitude of groups of indicators, each of which includes a plurality of sets of indicators, arranged to be selected over a plurality of control channels, a rotary selecting switch for each of said channels, a common continuously operating driving means for all of said switches, a slip clutch intermediate said driving means and said switch, means for retaining said switch against rotation under the influence of said driving means a release magnet for each of said selecting switches, each of said release magnets operating in response to each impulse transmitted over its associated channel to release the retaining means and permit the selecting switch to rotate the distance of one contact means controlled jointly by said selecting switches for selecting a desired set of indicators and means for subsequently operating said release magnets to restore said selecting switches to a normal position.

2. In an electrical indicating system of the class having a plurality of indicators, a rotary selecting switch, a control channel for said selecting switch, means for driving said selecting switch, means for retaining said switch against rotation, a release magnet for said switch for releasing its retaining means in response to each signal transmitted over the control channel, to permit the selecting switch to rotate in a forward direction the distance of one contact, means including the contacts of said switch for completing a selecting circuit for one of said indicators, means controlled by signals received over said control channel for subsequently operating said release magnet to permit said switch to rotate continuously in a forward direction and means including a contact of said switch acting when the switch reaches a predetermined position to restore its retaining means into position to bring the switch to rest.

3. An electrical indicating system comprising a multitude of sets of indicators, a plurality of control channels equal in number to the number of indicators of each set, a plurality of selecting devices and a plurality of signal repeating devices, means for transmitting a group of selecting and a group of answer signals over said channels, means for connecting said channels to said selecting devices to transmit said selecting signals thereto, said selecting devices operating to choose one of said sets of indictors, means to connect the same electrically to said signal repeating devices, means for transferring said channels to said signal repeating devices for the transmission of said answer signals thereto and means operating prior to the completion of the transmission of said answer signals to restore said selecting devices to normal position.

4. An electrical indicating system comprising a multitude of sets of indicators, a plurality of control channels equal in number to the number of indicators of each set, a plurality of selecting devices and a plurality of signal repeating devices, means for transmitting a group of selecting and a group of indicator operating signals over said channels, means for connecting said channels to said selecting devices to transmit selecting signals thereto, said selecting devices acting to choose one of said sets of indicators, means to connect the same electrically to said signal repeating devices, a counting relay chain, said counting relay chain operating after the completion of the transmission of said selecting signals to transfer said channels to the signal repeating devices for the transmission of indicator operating signals thereto and said counting chain again operating during the transmission of said indicator operating signals to restore said selecting devices to their normal positions.

5. An electrical indicating system comprising a plurality of indicators, a selecting device, a counting chain having a plurality of relays and a signal transmitting channel, means for transmitting a plurality of groups of signals over said channel, said signals operating said counting chain through a definite cycle, said counting chain acting to alternately connect said transmitting channel to said selecting device and to said indicators, to transmit said groups of signals to said selecting device and to said indicators in definite order and means for setting said counting chain in step with said groups of signals, said means comprising a relay separate from said counting chain, connected in operative relation to said selecting device so as to operate upon the transmission of a predetermined signal group, and means including the contacts of said relay serving to restore said selecting device to normal and to actuate the last relay of said counting chain to restore said counting chain to normal.

6. An electrical indicating system comprising a plurality of indicators, a selecting device, a counting chain having a number of relays operating in succession, means for transmitting a plurality of groups of signals over said channel, said signals operating said counting chain through a definite cycle, said counting chain acting to alternately connect said transmitting channel to said selecting device and to said indicators, to transmit said groups of signals to said selecting device and to said indicators in definite order and means for setting said counting chain in step with said groups of signals, said means comprising a restoration relay connected in operative relation to said selecting device so as to be operated upon the transmission of a predetermined signal group, said restoration relay upon the operation thereof preparing a circuit for operating the last relay of said counting chain and completing a circuit to restore said selecting switch to normal and means acting upon, the restoration of said selecting switch to normal for releasing said restoration relay, said last relay on release thereof acting to complete the circuit for the last relay of said counting chain whereby said counting chain is restored to normal.

7. An electrical indicating system comprising a multitude of groups of indicators, each group including a plurality of sets of indicators, a plurality of control channels equal in number to the number of indicators of each set, a relay for each of said groups and a relay for each of said sets of indicators, a selecting device acting in response to signals transmitted over said channels for completing a circuit for operating one of said group relays and one or more of said set relays to connect said channels to the selected indicators, a locking circuit for said relays independent of said selecting device, a counting relay chain controlled by signals transmitted over said channels for restoring said selecting device to normal during transmission of signals to said indicators and for breaking said locking circuit after the completion of the transmission of signals to said indicators.

8. An electrical indicating system comprising a multitude of groups of indicators each group including a plurality of sets of indicators, a plurality of control channels equal in number to the number of indicators of each set, a relay for each of said sets of indicators of a group, said relays being common to all groups, a selecting device acting in response to signals transmitted over said channels for completing a circuit for operating one of said relays to connect said channels to the selective indicators, a locking circuit for each of said relays independent of said selecting device, whereby said selecting device may be restored to normal prior to or during the transmission of signals to said indicators, and means for breaking said locking circuits after the completion of the transmission of signals to said indicators.

9. In an electrical indicating system of the class having a plurality of indicators, means for choosing desired indicators comprising a rotary selecting switch, a continuously acting driving means for said switch, means for retaining the switch against movement, a transmission channel, release means actuated by electrical impulses transmitted over said channel for releasing said retaining means to permit the switch to move forward a predetermined distance for each impulse for completing a portion of a selecting circuit, means also actuated by signals transmitted over said channel for completing the remainder of said circuit, said last means subsequently actuating said release means to permit said switch to rotate continuously in a forward direction, and means for restoring said retaining means to stop the switch when it reaches its initial position.

ROBERT STEENECK.